United States Patent [19]

Lequime et al.

[11] Patent Number: 5,179,424
[45] Date of Patent: Jan. 12, 1993

[54] OPTOELECTRONIC APPARATUS FOR THE REMOTE MEASURING OF A PHYSICAL MAGNITUDE

[75] Inventors: Michel Lequime, Eguilles; Catherine Lecot, Vitrolles; Hugues Giovannini, Marseille, all of France

[73] Assignee: Bertin & Cie, Plaisir, France

[21] Appl. No.: 651,336

[22] PCT Filed: Jun. 13, 1990

[86] PCT No.: PCT/FR90/00421
  § 371 Date: Mar. 5, 1991
  § 102(e) Date: Mar. 5, 1991

[87] PCT Pub. No.: WO90/15969
  PCT Pub. Date: Dec. 27, 1990

[30] Foreign Application Priority Data

Jun. 14, 1989 [FR] France .................. 89 07856

[51] Int. Cl.$^5$ .................. G01B 9/02
[52] U.S. Cl. .................. 356/351; 356/345; 250/227.29
[58] Field of Search .................. 356/345, 349, 351, 361; 250/227.19, 227.27

[56] References Cited

U.S. PATENT DOCUMENTS

| | | | |
|---|---|---|---|
| 4,495,411 | 1/1985 | Rashleigh | 250/227.19 |
| 4,536,088 | 8/1985 | Rashleigh et al. | 356/345 |
| 4,609,290 | 9/1986 | Cahill | 356/351 |
| 4,814,604 | 3/1989 | Lequime | 356/351 |
| 4,867,565 | 9/1989 | Lequime | 356/351 |

FOREIGN PATENT DOCUMENTS

WO87/05691 9/1987 PCT Int'l Appl. .
2202936 10/1988 United Kingdom .

OTHER PUBLICATIONS

Patent Abstracts of Japan, vol. 9, No. 93, Apr. 23, 1985, p. 351, JP 59-221618, Shimazu Seisakusho K.K.
The International Congress on Optical Science & Engineering, 12-15 Mar. 1990, La Haye, Conference 1267, Paper 1267-39, Session 5, M, Lequime, et al., "A Dual-Wavelength Passive Homodyne Detection Unit for Fiber-Coupled White-Light Interferometers".

Primary Examiner—Samuel A. Turner
Attorney, Agent, or Firm—Bell, Seltzer, Park & Gibson

[57] ABSTRACT

An optoelectronic apparatus for the remote measuring of a physical magnitude which comprises two light sources emitting luminous fluxes centered on two different wavelengths and means for controlling the alternate operation of these light sources. A sensor is provided for receiving the luminous flux emitted by the respective light sources and causing a periodic spectral modulation of the luminous flux a frequency depending on the value of the physical magnitude to be measured. An analysis means is provided for analyzing the luminous flux transmitted by the sensor, the analysis means being of the static type and including a birefringent element which is tuned to the sensor and produces an optical path difference close to that produced by the sensor.

18 Claims, 2 Drawing Sheets

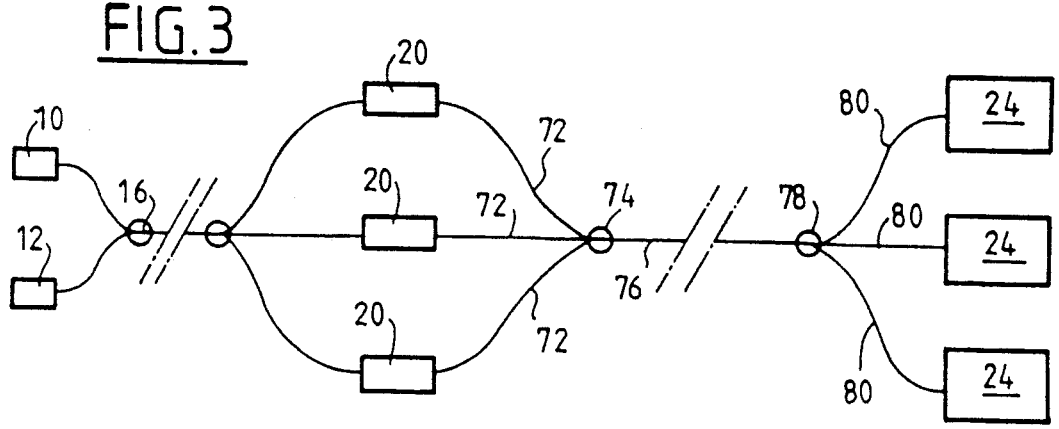
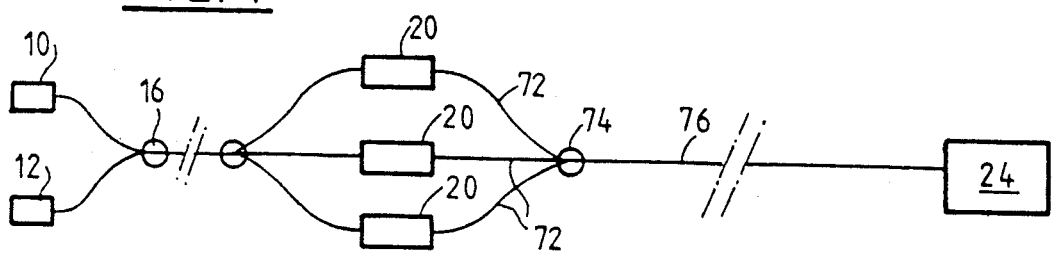
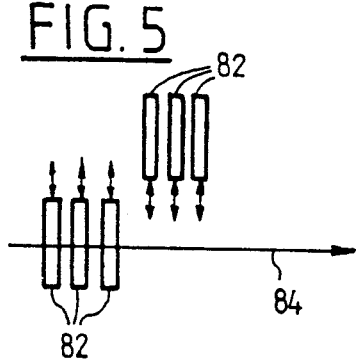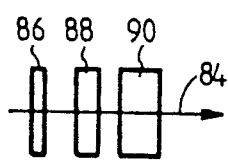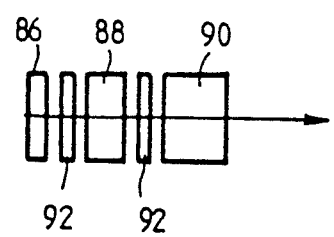
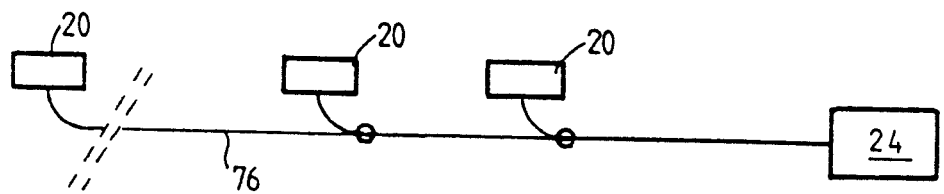

OPTOELECTRONIC APPARATUS FOR THE REMOTE MEASURING OF A PHYSICAL MAGNITUDE

The invention relates to an optoelectronic apparatus for the remote measuring of a physical size, this apparatus being of the type comprising a light source, a sensor subjected to the physical magnitude to be measured and causing spectral modulation of the luminous flux received from the source, at a frequency depending on the physical magnitude to be measured, as well as means for analysing the luminous flux transmitted by the sensor, for determining the value of the physical magnitude to be measured from the spectral modulation frequency of the luminous flux transmitted by the sensor.

Processes and devices of this type are already known in which sensors are used comprising birefringent elements sensitive to the physical magnitude to be measured. The analysis means generally comprise a demodulating interferometer tuned to the sensor for analysing, for example, a characteristic modulation of a beat frequency between the spectral modulation due to the sensor and that due to the demodulating interferometer.

The invention has as object an apparatus for measuring a physical magnitude at a distance, using means of the above type, i.e. a sensor sensitive to the physical magnitude to be measured, causing spectral modulation of the luminous flux transmitted at a frequency which depends on the value of the magnitude to be measured and analysis means which are static, compact and extremely accurate.

The invention also has as object an apparatus of this type in which the analysis means make it possible to obtain the absolute phase of the luminous flux transmitted by the sensor.

The invention also has as object an apparatus of the above type for multiplexing light sensors of the same type or of different types, situated in the same zone or in different zones.

For this, the invention provides an optoelectronic apparatus for the remote measuring of a physical magnitude, comprising a light source, a sensor subjected to the physical magnitude to be measured and causing periodic spectral modulation of the luminous flux received from the source, at a frequency depending on the physical magnitude to be measured and means for analysing the luminous flux transmitted by the sensor, these analysis means comprising a birefringent element tuned to the sensor and producing an optical difference of path close to that produced by the sensor, characterized in that the analysis means are of the static type and comprise polarization separating cubes associated with photodetectors and data processing means connected to the photodetectors for computing and determining the modulo 2 phase of the analysis signal transmitted by the birefringent element of the analysis means, and in that the apparatus comprises two light sources emitting luminous fluxes centred on different wavelengths, and means for controlling the alternate operation of these two light sources, the difference of the central wavelengths of the two light sources being such that the absolute value of the difference of the phases of the signals transmitted by the birefringent element remains less than $\pi$ for a given range of values of the physical size to be measured.

The polarization separating cubes which are traversed by the luminous flux coming from the sensor give (except for the coefficients) signals of the type $1 \pm \cos\rho$ and/or $1 \pm \sin\rho$, from which the phase of the signal can be determined modulo $2\pi$; such indetermination of $2 k\pi$ may be removed by alternately using two light sources whose central wavelengths are relatively close to each other. Thus, the phase difference of the signals corresponding to these two light sources, for the same value of the physical magnitude to be measured, remains less than $2\pi$ and the measurement of this phase difference makes it possible to remove the indetermination of $2 k\pi$ on the determination of the absolute phase of the signal from the sensor. The knowledge of the value of the absolute phase makes it possible to determine the spectral modulation frequency introduced by the sensor and so, with calibration, to determine the value of the physical magnitude to be measured.

The analysis means are therefore entirely static and do not comprise any mobile elements and may further by produced in a particularly compact form.

In a preferred embodiment of the invention, the analysis means comprise successively, with respect to the direction of propagation of the luminous flux transmitted by the sensor, a first polarization separating cube transmitting over two analysis channels two light signals polarized in perpendicular planes; said birefringent element, which is placed on the two analysis channels; a quarter-wave plate placed on one only of the analysis channels; two polarization separating cubes each placed on an analysis channel; and four photodetectors, each placed at one of the outputs of these separating cubes.

Such an arrangement makes it possible to obtain, on the four photodetectors, signals which are, apart from the coefficients, of the type $1+\cos\rho$, $1-\cos\rho$, $1+\sin\rho$, $1-\sin\rho$, from which the modulo $2\pi$ phase of the signal transmitted by the sensor and by the birefringent element of the analysis means may be simply determined. In addition, the birefringent element is common to the two analysis channels and the analysis means work on the whole of the luminous flux transmitted by the sensor, since the two polarization states of this luminous flux are used.

Preferably, each said polarization separating cube is associated with a second polarization separating cube, placed at one of its outputs, so that the luminous fluxes, one of which leaves the first separating cube directly and the other the second separating cube, are parallel and oriented in the same direction.

The result is that the four photodetectors may be disposed in the same line, which facilitates mounting thereof on a printed circuit or a common thermal regulation base.

In accordance with another characteristic of the invention, said quarter-wave plate is achromatic.

The sine and cosine of the phase of the light signal may thus be actually measured at the same point of the envelope of this signal, and not at different points. The accuracy and linearity of the measurement are greatly enhanced thereby.

According to yet another characteristic of the invention, the birefringent element forming part of the analysis means is insensitive to temperature variations and has a very low spectral dependence.

Preferably, this birefringent element is formed of two plates coupled side by side, whose slow and fast axes are crossed.

Advantageously, these two plates are formed of KDP and calcite respectively.

The light sources used in the apparatus according to the invention may be light-emitting diodes or super light-emitting diodes (also called super radiant) which are associated with thermal regulation circuits, or else they may comprise a common light source with wide spectrum, for example a filament lamp or an arc lamp, and interferential filters for the transmission of two predetermined wavelengths, as well as specific means for regulating the temperature of these filters.

The apparatus according to the invention further comprises a calibration circuit, having a direct connecting channel between the light sources and the analysis means, a connecting channel between a calibration sensor and the analysis means and obturators mounted in these two channels and in the measuring channel going from the measurement sensor to the analysis means.

The invention is further well adapted for multiplexing several sensors. For example, the apparatus according to the invention may comprise several sensors mounted in parallel, having different frequencies of spectral modulation of the luminous flux which they transmit and as many analysis means which are mounted in parallel and each comprise a birefringent element tuned to the corresponding sensor, the sensors being connected to the analysis means by a common optical fibre and optical couplers.

In a variant, several sensors having different spectral modulation frequencies may be mounted in parallel and connected to common analysis means by optical couplers and a common optical fibre, the analysis means then comprising a set of birefringent elements which can be tuned to each sensor successively.

In another variant, the analysis means may be connected by a common optical fibre to sensors which are remote from each other by distances such that the signals from these sensors may be separated in time during measurement intervals defined by the light pulse widths emitted by the light source.

The invention will be better understood and other characteristics, details and advantages thereof will be clear from the following description, given by way of example with reference to the accompanying drawings in which :

FIGS. 3 and 4 represent two methods of multiplexing sensors in an apparatus according to the invention;

FIGS. 5, 6 and 7 represent birefringent plate assemblies;

FIG. 8 shows another method of multiplexing sensors.

Figure 1:
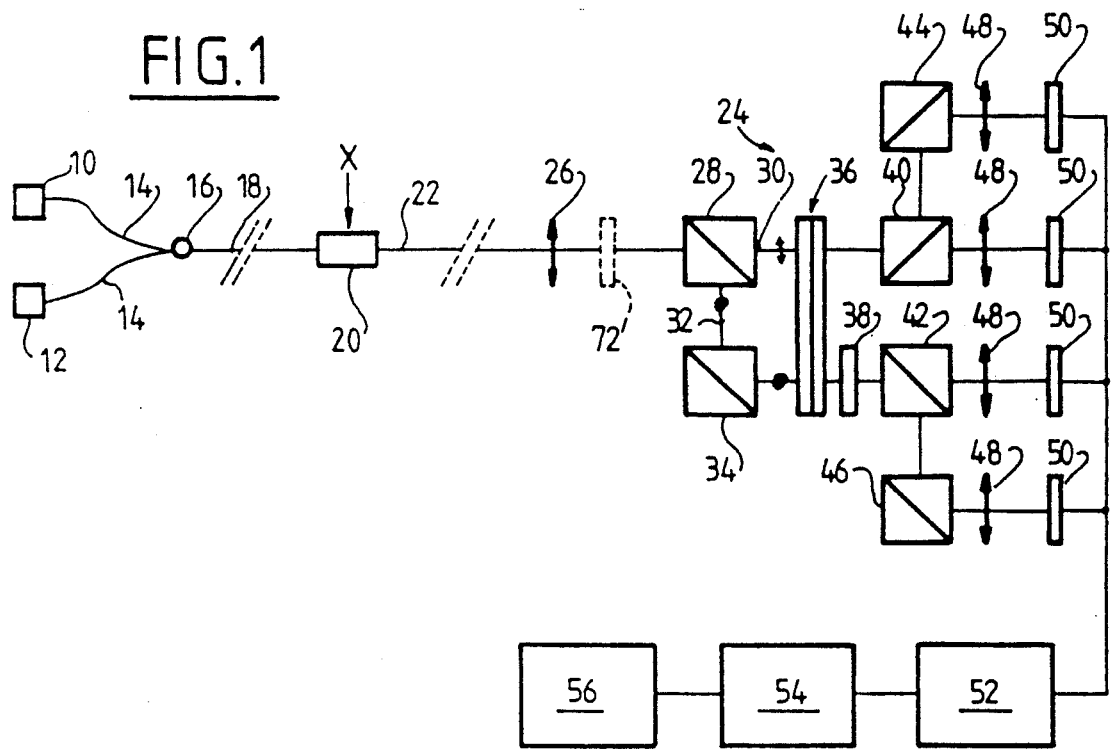
FIG. 1 shows schematically an apparatus according to the invention.

Reference will be made first of all to FIG. 1 which shows schematically the structure of an optoelectronic apparatus for the remote measuring of a physical magnitude in accordance with the invention.

This apparatus comprises two light sources 10 and 12 emitting luminous fluxes whose central wavelengths are relatively close to each other (for example such that $$\Lambda = \frac{\lambda_1 \cdot \lambda_2}{\lambda_1 - \lambda_2} \approx 10 - 50 \, \mu m)$$

and whose spectral widths verify the relation :

$$\Delta o > \frac{k \cdot \lambda^2}{\Delta \lambda}, \text{ i.e. } \Delta \lambda > \frac{k \cdot \lambda^2}{\Delta o}$$

where $\Delta o$ is the difference of path generated in the birefringent element of the analysis means, and k is an integer between 2 and 5.

The light sources 10 and 12 are connected by optical fibres 14 and a Y coupler 16 to a common optical fibre 18 which may have a great length and which extends to a sensor 20 of interferometric type, which comprises an element sensitive to the physical magnitude to be measured X.

The sensor is connected by an optical fibre 22 to analysis means 24.

These analysis means comprise an optical system 26 at the focal point of which the end of the optical fibre 22 is placed and which delivers a light beam with slight divergence to a first polarization separating cube 28 having two outputs, one of which 30 transmits a light signal polarized in the plane of the drawing and the other 32 a light signal polarized perpendicularly to this plane. This output 32 is fed to another polarization separating cube 34, identical to cube 28 and oriented in the same way, which receives the light signal transmitted by the output 32 and reflects it in a perpendicular direction, i.e. parallel to output 30 and in the same direction as it.

At the output of separating cubes 28 and 34 is disposed a birefringent element 36 whose axes are oriented at 45° from the polarization axes of the light signals. This birefringent element 36 is traversed by the light signals leaving cubes 28 and 34 and introduces into these signals an optical difference of path which depends on its thickness and its birefringence. As will be seen further on, the birefringent element 36 is tuned to sensor 20 so that the optical difference of path which it produces is close to that produced in sensor 20 subjected to the magnitude X to be measured.

The analysis channel corresponding to the output of the second separating cube 34 comprises, downstream of the birefringent element 36, a quarter-wave plate 38 whose axes merge with those of the birefringent element 36.

Each channel leaving the birefringent element 36 (and the quarter-wave plate 38) comprises a polarization separating cube 40, 42 associated with another identical cube 44, 46 so that the outputs of the four separating cubes are parallel and oriented in the same direction. At each optical fibre is disposed an optical system 48 associated with a photodetector 50 having a relatively large sensitive surface, which is for example from 5 to 10 times greater than that of the image of the cross section of the optical fibre 22 so as to avoid all the small diaphragm problems due to misalignments and consequently simplify the adjustment operations. The photodetectors 50 may then be mounted in line, for example on the same printed circuit board and are connected to reading circuits 52, themselves connected by an A-D converter 54 to data processing means 56 comprising computing means.

The operation of this apparatus will now be described.

When one of the light sources 10, 12 is operating, the luminous flux which it emits is transmitted by the optical fibre 14, coupler 16 and optical fibre 18 to sensor 20 which is subjected to the physical magnitude to be measured. The sensitive element of sensor 20, which may be a birefringent element or a MICHELSON interferometer for example, for which the difference of path is great with respect to the coherence length of the source, produces periodic spectral modulation of the luminous flux which it receives from the source, such modulation having a frequency which is a simple function of the physical magnitude to be measured X.

The luminous flux thus modulated by sensor 20 is transmitted to analysis means 24 by the optical fibre 22, arrives at the first polarization separating cube 28 and is then separated into two light signals polarized in perpendicular planes, which traverse the birefringent element 36. This birefringent element 36 introduces an optical difference of path which is chosen so as to be close to that introduced by the sensor 20, so that the birefringent element 36 produces periodic spectral modulation of the light signal which passes through it, at a frequency close to the spectral modulation frequency produced by sensor 20. One of the light signals passing through the birefringent element 36 reaches the polarization separating cube 40 directly and is divided by this cube 40 into two light signals polarized in perpendicular planes, one of which is fed by cube 44 to a first photodetector 50 and the other of which is transmitted by cube 40 to a second photodetector 50.

The other light signal passing through the birefringent element 36 passes through the quarter-wave plate 38, then is separated into two signals polarized in perpendicular planes by cube 42, one of these signals being transmitted directly to a third photodetector 50 whereas the other signal is reflected by the fourth separating cube 46 to the fourth photodetector 50.

The signals received by these photodetectors are respectively of the type :

Io $[1+m(\phi) \cos \phi]$
Io $[1+m'(\phi) \sin \phi]$
Io $[1-m(\phi) \cos \phi]$
Io $[1-m'(\phi) \sin \phi]$ where $m(\phi)$ and $m'(\phi)$ designate the visibility factors due both to the low coherence of the sources used and to the quality of the sensor and detector means, $\phi$ is the absolute phase of the signal and Io its intensity.

The choice of an achromatic quarter-wave plate at the level of the sine channel guarantees the quality of the visibility factors $m(\phi)=m'(\phi)$.

By differential amplification of the output signals of the photodetectors, we obtain :
2Iom $(\phi) \cos \phi$ and 2Iom'$(\phi) \sin \phi$
then by division :

$$\frac{m'(\phi).\sin\phi}{m(\phi).\cos\phi} = \frac{m'(\phi).\tan\phi}{m(\phi)}$$

which allows access to be had to tan $\phi$, providing there is equality of the visibility factors guaranteed by use of the achromatic plate.

The phase of the signal may thus be determined with an indetermination of a multiple of $2\pi$, from the argument of the tangent function and from the signs of the sine and cosine functions.

We have then the following relation between the absolute phase and its modulo $2\pi$ value :

$\phi=\pi+2 K\rho$, $K$ being an integer.

The absolute phase $\phi$ is furthermore related to the value of the magnitude X to be measured by the following relation :

$$\phi = 2\pi \frac{\Delta(X) - \Delta o}{\lambda}$$

with $\Delta(X)$=optical difference of path in sensor 20;
$\Delta o$ optical difference of path in element 36;
$\lambda$=central wavelength of the luminous flux emitted by the source.

It can be seen that knowledge of the absolute phase of the signal makes it possible to determine the optical difference of path in sensor 20 subjected to the physical magnitude to be measured and so the value of the size, by simple calibration of sensor 20.

To lift the indetermination of 2 $k\pi$ and obtain the absolute value of the signal, the procedure is as follows:

two light sources 10, 12 are chosen emitting at wavelengths $\lambda_1$ and $\lambda_2$ which are little different from each other, so that the absolute phases of the corresponding signals (for the same value of the physical magnitude to be measured) respect the following condition for a whole given range of values of the physical magnitude to be measured X1:

$|\Delta\phi| = |\phi_1 - \phi_2| < \pi$

From said equations, we then obtain :
$\phi_1 = \rho_1 + 2 k_1\pi$
$\phi_2 = \rho_2 + 2 k_2\pi$
$\Delta\phi = \Delta\rho \pm 2 \pi$
with $|k_2 - k_1| \leq 1$
Several cases must then be analysed:
a) $\Delta(X)$ presents no spectral dependence and the spectral dependence of $\Delta o$ is assumed negligible :

$$\phi_1 = \rho_1 + 2K_1\pi = \frac{2\pi}{\lambda_1} [\Delta(x) - \Delta o]$$

$$\phi_2 = \rho_2 + 2k_2\pi = \frac{2\pi}{\lambda_2} [\Delta(x) - \Delta o]$$

$$\Delta\phi = \Delta\rho = \phi_1 - \phi_2$$

$$\Delta\rho = \frac{2\pi}{\Lambda} [\Delta(x) - \Delta o] \text{ with } \Lambda = \frac{\lambda_1 \lambda_2}{\lambda_1 - \lambda_2}$$

$$2k_1\pi = \frac{2\pi}{\lambda_1} \cdot \frac{\Lambda}{2\pi} \Delta\rho - \rho_1$$

$$= \frac{\Lambda}{\lambda_1} \Delta\rho - \rho_1 => k_1 = \frac{1}{2\pi} \left[ \frac{\Delta\rho\Lambda}{\lambda_1} - \rho_1 \right]$$

similarly $$k_2 = \frac{1}{2\pi} \left[ \frac{\Lambda}{\lambda_2} \Delta\rho - \rho_2 \right]$$

b) $\Delta(x)$ and $\Delta o$ present non-negligible spectral dependences.

By calibration or computation we plot the curve :

$\Delta\rho = F(x)$, then we inverse $x = F^{-1}(\Delta\rho)$ and with every value of $\Delta\rho$, we associate an approximate value of parameter X. This approximate value is used for determining $k_1$ and $k_2$.

Whether the different values $\rho_1$, $\rho_2$, $k_1$, $k_2$ are indeed compatible with each other may be verified by a likelihood calculation.

The fluctuations of $\Delta$ which are due to the measurement inaccuracies results in giving to $k_1$ and $k_2$ values which are not always exactly integer numbers. Then the closest integer value of the result of the calculation is chosen. For example, if the value 5.05 is obtained by calculation for $k_1$, $k_1$ will be given the integer value 5.

It is then possible to calculate the value of the absolute phase of the signal corresponding to operation of a light source 10 or 12, and to derive therefrom the value of the difference of optical path produced in the sensor, and so the value of the physical magnitude to be measured X.

Figure 2:
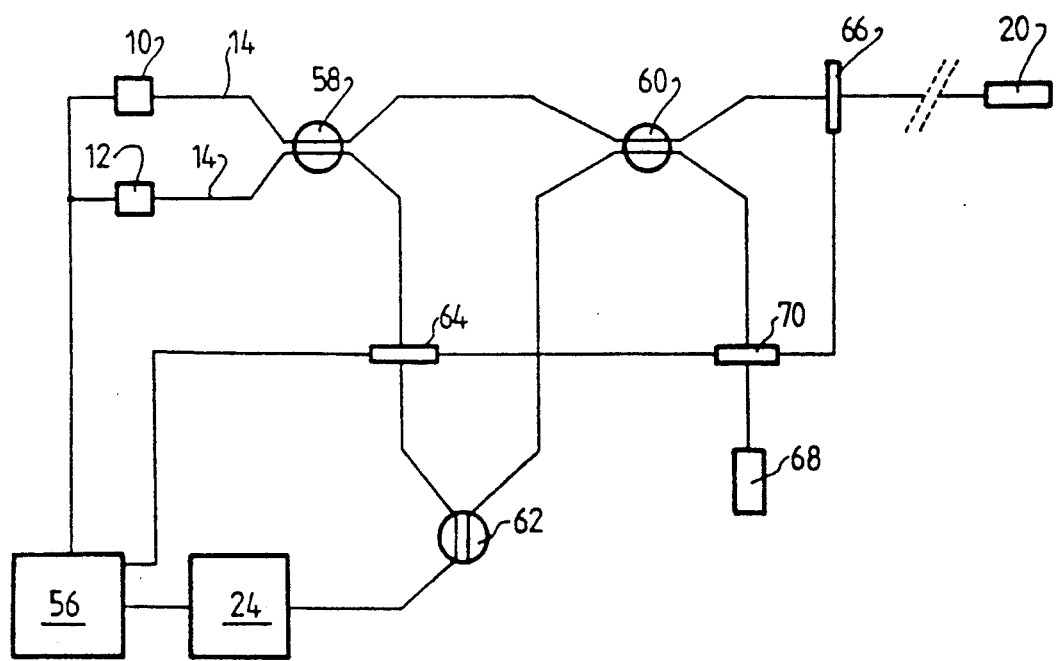
FIG. 2 shows schematically the circuit for calibrating this apparatus.

In practice, the apparatus according to the invention also comprises the control and calibration circuit which is shown schematically in FIG. 2. In this figure, it will be noted that sensor 20 works by reflection, whereas it works by transmission in the embodiment of FIG. 1. This is a simple technical equivalence which changes neither the functions nor the results of the invention.

The control and calibration circuit shown in FIG. 2 comprises an optical coupler 58 of the 50/50 type whose inputs are connected by optical fibres 14 to the light sources 10 and 12 and whose outputs are connected, respectively, to another optical coupler 60 of 50/50 type and to an optical coupler 62 of 10/90 type via an obturator 64. An optical fibre of optical coupler 60 is connected to sensor 20 via an obturator 66 and its other output is connected to a calibration sensor 68 via an obturator 70. The output 10 of the optical coupler 62 leads to the analysis means 24 which are connected to the data processing means 56. These means 56 comprise means for controlling the operation of the light sources 10, 12 and of the obturators 64, 66, 70.

Generally, the signals which are received at detectors 50 are of the following type :

$S_0 = I_0 [1 + m_0.M(\phi) \cos \phi]$
$S_1 = I_1 [1 - m_1.M(\phi) \cos \phi]$
$S_2 = I_2 [1 + m_2.M(\phi + \epsilon) \sin (\phi + \epsilon)]$
$S_3 = I_3 [1 - m_3.M(\phi + \epsilon) \sin (\phi + \epsilon)]$ where $M(\phi)$ designates the visibility of the modulation due to the coupled effects of the low coherence of the source and of the quality of the sensor used and $\epsilon$ the residual quadrature error due to the imperfect character of the quarter-wave plate.

When obturator 64 is open and obturators 66 and 70 are closed, on the four analysis channels we find non frequency modulated signals, namely :

$I_0$, $I_1$, $I_2$, and $I_3$ respectively.

We then calculate the corrector coefficients :

$\alpha_1 = I_0/I_1; \alpha_2 = I_0/I_2; \alpha_3 = I_0/I_3$ which make it possible to equalize the means signal levels seen by each detector; then the following corrected differences are calculated :

$S_0 - \alpha_1 S_1 = I_0(m_0 + \alpha_1 m_1)M(\phi) \cos\phi$ $\alpha_2 S_2 - \alpha_3 S_3 = I_0(\alpha_2 m_2 + \alpha_3 m_3)M(\phi+\epsilon) \sin(\phi+\epsilon)$ then the ratio between these corrected differences :

$$R = \frac{\alpha_2 S_2 - \alpha_3 S_3}{S_0 - \alpha_1 S_1} =$$

$$\frac{(\alpha_2 m_2 + \alpha_3 m_3)}{m_0 + \alpha_1 m_1} \cdot \frac{M(\phi + \epsilon)}{M(\phi)} \cdot \frac{\sin(\phi + \epsilon)}{\cos\phi}$$

By closing obturators 64 and 66 and opening obturator 70, a signal may be fed to the analysis means 24 which has been modulated by the calibration sensor 68, and for which the resultant phase $\phi$ is well known.

If the quality of the quarter-wave plate is suitable (achromatism and phase shift tolerance) we have :

$M(\phi + \epsilon) = M(\phi)$ with sufficient accuracy.

Then the signals obtained are such that :

$$R = \frac{\alpha_2 m_2 + \alpha_3 m_3}{m_0 + \alpha_1 m_1} \times \frac{\sin(\phi + \epsilon)}{\cos\phi}$$

It will be assumed first of all that $\epsilon = 0$. Under these conditions, the use of the calibration sensor allows the following ratio to be measured :

$$\frac{\alpha_2 m_2 + \alpha_3 m_3}{m_0 + \alpha_1 m_1} = \frac{1}{K}$$

and to derive therefrom the balance correction factor K. Henceforth signals of the following type will be used :

$$KR = \frac{\sin(\phi + \epsilon)}{\cos\phi}$$

($\epsilon$ being known, its measurement having been made once and for all at the factory).

The calibration circuit then makes it possible to overcome the drifts of the detection system and to recalculate, at regular intervals, the continuous background corrector coefficients $\alpha_1$, $\alpha_2$, $\alpha_3$;

the balance corrector coefficient K.

Furthermore, if the calibration sensor is formed of two separate elements which can be switched sequentially and which deliver two phases $\phi$ and $\phi'$, such that $\phi' = \phi + \pi/2$ then the measurement of the corrected coefficient leads to the following signals :

$$R = \frac{1}{K} \cdot \frac{\sin(\phi + \epsilon)}{\cos\phi} \text{ and } R' = \frac{1}{K} \cdot \frac{\cos(\phi + \epsilon)}{\sin\phi}$$

and so $$R = \tan\phi \cdot \tan(\phi + \epsilon) = \tan\phi \left( \frac{\tan\phi + \tan\epsilon}{1 - \tan\phi\tan\epsilon} \right)$$

which makes it possible, knowing $\phi$, to calculate $\epsilon$ independently of the knowledge of the balance corrector factor.

This quadrature error may also be determined by means of a calibration sensor of MICHELSON type, one of whose mirrors is moved in translation with precision through a slaved piezoelectric movement. Recording of the signals obtained after correction and differential amplification during a linear movement greater than $\lambda$ makes it possible to measure $\epsilon$ and K and then use them as values for "factory" calibration of the apparatus.

This calibration sensor may further be formed of the following elements :

a polarizer, a compensated birefringent plate similar to element 36 used in the analysis system (oriented at 45° with respect to the analyzer), an achromatic quarter-wave plate one of whose axes merges with the analyzer, an adjustable orientation polarizer.

With this sensor controlled phase variations may be generated, since the apparent phase of the signal varies as the double of the angular orientation $\beta$ of the rotating polarizer.

A path difference may then be generated corresponding to the birefringent element alone ($\beta=0$) or $\pi/2$ ($\beta=\pi$) may be added thereto for exchanging the sine and cosine channels and thus determining $\epsilon$ and K.

Then, by closing the obturators 64 and 70 and opening obturator 66, measurements may be made by means of sensor 20.

It may also be necessary to calibrate at regular intervals the effective central wavelength $\lambda°$ of the light source used, the variation of this wavelength being possibly due to :

ageing of the source, residual thermal drift of this same source, modification of the spectral transmission properties of the sensor/connecting filter/analyzer assembly.

To achieve this, one solution consists in making two independent measurements of the absolute phase $\phi$:

the first with a demodulator characterized by a difference of path $\Delta°$:

$$\phi = \frac{2\pi}{\lambda_o} [\Delta(x) - \Delta o]$$

the second with a demodulator characterized by a difference of path $\Delta'°$ different from $\Delta°$:

$$\phi' = \frac{2\pi}{\lambda_o} [\Delta(x) - \Delta'o]$$

The difference between $\Delta°$ and $\Delta'°$ being small, stable and known with a value between $\lambda°$ and the variation of the difference of path in the sensor during a deviation of the parameter equal to the measurement range.

For comparing the two values $\phi$ and $\phi'$, it is easy to suppress the unknown $\Delta(x)$ then to derive $\Delta°$ therefrom, knowing the difference between $\Delta°$ and $\Delta'°$.

$$\lambda_o = \frac{2\pi}{\phi - \phi'} (\Delta'o - \Delta o)$$

These measurements may be achieved for the two wavelengths $\lambda_1$ and $\lambda_2$ used in the system independently and thus allow periodic re-calibration of $\lambda_1$, $\lambda_2$ and of the beat wavelength $\lambda$.

The double determination of the absolute phase $\phi$ may be effected :

either by means of two demodulation systems operating in parallel and characterized by differences of path $\Delta°$ and $\Delta'°$, or by inserting in front of element 36 a birefringent plate with small difference of path $\delta$ which is rotatable between two positions separated by 90° and such that its slow and fast axes merge with the neutral lines of the birefringent element 36 in each of its positions of use (0°, 90°).

In this case, two differences of path may be obtained sequentially by using the two bistable positions of the low birefringence plate, with for example :

Position 1 (0°) : $\Delta° = \Delta + \delta$

Position 2 (90°): $\Delta'° = \Delta - \delta$ and so $\Delta° - \Delta'° = 2\delta$ In the measurement in which such a plate is present and used in the demodulation optical system, it could in fact be used at three stable positions characterized by the orientation angles 0, 45 and 90°:

Position 1 (0°)$\Delta° = \Delta + \delta$

Position 2 (90°)$\Delta° = \Delta - \delta$

Position 3 (45°)$\Delta° = \Delta$ where $\Delta$ designates the characteristic difference of path of element 36. The rest position of plate $\delta$ could then be chosen as a function of the effective difference of path created by the sensor, whereas the calibration position would then become the adjacent accessible position for obtaining the highest modulation index.

This Would result in :

either simplifying the manufacture of the sensor by allowing relaxation of the tolerances concerning the value of the mean difference of path it generates, or increasing the useful operating range, by shifting as required the demodulation frequency by $\pm\delta$.

For the measurements, the light sources 10 and 12 are controlled in rapid succession, for example so as to carry out in a millisecond the following cycle of four measurements : measurement during operation of source 10, measurement on extinction of source 10, measurement during operation of source 12 and measurement on extinction of source 12. Thus, by difference, the background noises and the influence of parasite light can be eliminated.

The light sources 10, 12 are for example light emitting diodes associated with a thermal regulation circuit, so that the central wavelengths of the radiations emitted are insensitive to temperature variations. A wide spectrum source may also be used, such as a filament lamp or an arc lamp, which is associated with interferential filters for taking the two desired wavelengths from the spectrum emitted by the lamp. A thermal regulation circuit for the interferential filters makes these wavelengths insensitive to temperature variations.

Light-emitting or superradiant diodes serving as light sources may be regulated thermally by Peltier elements with an accuracy of about 0.1° C., which corresponds to an accuracy of the order of 0.03 nm in wavelength. In the case of a wide spectrum source associated with interferential filters, thermal regulation of the interferential filters with an accuracy of about 1° C. is enough to obtain the same accuracy of 0.03 nm in wavelength.

With the birefringent element 36 forming part of the analysis means 24, it also must be insensitive to temperature variations and have a very low spectral dependence. These results are obtained by forming the element 36 from two coupled plates, one made from KDP (potassium dehydrogenophosphate) (or possibly Kd*P in which the hydrogen atoms are replaced by deuterium atoms), the other from calcite (CaCO3). The slow and fast axes of these two plates are crossed.

Thus a fairly strong birefringence of element 36 is obtained, which is moreover perfectly insensitive to thermal variations (the heat sensitivities of the two plates cancelling each other out exactly) and which have very low spectral dependence (the spectral dependences of the two plates cancelling each other out at least in the first order).

If e1 designates the calcite thickness and e2 that of KDP, the total birefringence of the birefringent plate 36 is written :

$$B = e_1 \Delta n_1 - e_2 \Delta n_2$$

The athermalization condition is written as a first approximation (negligible thermal expansion):

$$\frac{\partial B}{\partial t} = 0 = e_1 \frac{\partial \Delta n_1}{\partial t} = e_2 \frac{\partial \Delta n_2}{\partial t}$$

and makes it possible to determine the ratio of the thicknesses k $$k = e_2/e_1 = \frac{\partial \Delta n_1/\partial t}{\partial \Delta n_2/\partial t} = 0.973 \text{ to } \lambda = 830 \text{ nm}$$

which the KDP/calcite pair must satisfy (the resultant birefringence not being zero).

Furthermore, the exact thickness of each plate is determined by the tuning condition at the middle of the range of parameter X.

Let Xo be this value and $\Delta c(Xo, \lambda)$ the associated difference of pace in the sensor; the tuning condition is then written $$\Delta(\lambda o) - \lambda_o \frac{\partial \Delta}{\partial \lambda} = 0 \text{ for } \lambda = \lambda_o$$

with
$$\Delta(\lambda) = \Delta c(Xo, \lambda) - \Delta o(\lambda)$$

$\lambda_o$ being the central wavelength of the source.

$\Delta_o$ can then be calculated and the exact values of the two KDP and calcite plates corresponding to the sensor considered may be derived therefrom.

With the value of K chosen, it can further be shown that the relative spectral dependence of plate 36 is very small:

$$\frac{1}{B} \cdot \frac{\partial B}{\partial \lambda} \ll 1 \text{ for } k = 0.973.$$

Moreover, the quarter-wave plate 38 placed behind the birefringent element 36 must be achromatic so that the sine and cosine functions may be measured at the same point of the envelope of the light signal, which guarantees high measurement accuracy and excellent linearity over the difference of pace range.

For that, the above expressed tuning condition must be satisfied in the two channels for the same value of the difference of pace in the sensor.

For the cosine channel, we have:

$$\Delta c(Xo, \lambda o) - \lambda_o \frac{\partial \Delta c}{\partial \lambda}(Xo, \lambda o) - \Delta o(\lambda o) + \lambda o \frac{\partial \Delta}{\partial \lambda}(\lambda o) = 0$$

For the sine channel:

$$\Delta c(Xo, \lambda o) - \lambda_o \frac{\partial \Delta}{\partial \lambda} C(Xo, \lambda o) - \Delta o(\lambda o) -$$

$$\delta(\lambda o) + \lambda o \frac{\partial \Delta}{\partial \lambda}(\lambda o) + \lambda o \frac{\partial \delta}{\partial \lambda}(\lambda o) = 0$$

where $\delta(\lambda)$ designates the difference of path associated with the quarter-wave plate or else:

$$\lambda_o \frac{d\delta}{d\lambda} = \delta(\lambda o) => \delta(\lambda o) = k\lambda o$$

and $$\delta(\lambda o) = \frac{\pi}{2} \times \frac{\lambda o}{2\pi} = \frac{\lambda o}{4} => k = \frac{1}{4}$$

$\delta(\lambda) = \lambda/4$ for all $\lambda$.

which characterizes an achromatic quarter-wave plate.

As has been shown schematically in FIG. 1, a polarizing element 72 may be inserted between the input optics 26 of the analysis means and the first separating cube 28, when the optical fibre 22 is a multimode fibre having a relatively small length. In fact, when sensor 20 is of the polarizing type and when its connection to the analysis means 24 is of the order of a few metres, there may remain in the light signal transmitted to the analysis means 24 a polarization residue which will influence the separations achieved by cube 28. The polarizing element 72 oriented at 45° from the first cube 28 will allow the two analysis channels to be balanced and the ratio of their intensities is perfectly stabilized, whatever the polarization state of the signal to be analyzed.

When the connection between sensor 20 and the analysis means 24 is provided by a multimode optical fibre of great length, the light is completely depolarized when it reaches the analysis means 24 and the polarizing element 72 is then useless (which corresponds to a gain of 3 dB).

The apparatus according to the invention has the following essential advantages:

- a single birefringent element 36 for the two analysis channels,
- no loss of flux (the two polarization states of the luminous flux are used),
- small size (the analysis means with the acquisition, electronic demultiplexing and A-D conversion means may be housed in a case having dimensions of the order of 2×10×5 cm3).
- very high accuracy (a resolution of 200 000 points is obtained in the case where only a single sensor is used, which corresponds to an accuracy of the order of a thousandth of a degree Celsius in temperature and a twenty thousandth of the wavelength in phaseshift),
- large multiplexing capacity (more than ten sensors).

Different multiplexing modes are shown in FIGS. 3, 4 and 8.

In FIG. 3 several sensors 20 are connected by optical fibres 72 to an optical coupler 74 which is connected by an optical fibre 76 to another optical coupler 78 of the same type. The detection means 24, equal in number to that of sensors 20, are connected by optical fibres 80 to the optical coupler 78. Each detection means 24 associated with a sensor 20 comprises a birefringent element tuned to the corresponding sensor 20.

In the embodiment of FIG. 4, several sensors 20 are connected by optical fibres 72 to an optical coupler 74 which is connected by an optical fibre 76 to detection means 24. In this case, the latter comprise a set of birefringent elements of the same type as the composite plate 36, which may be tuned successively to each sensor 20.

Several variants can be considered for this function:
a) birefringent plates of type 36 adapted to each sensor and which can be brought into (or removed from) the path of the light beam by translation (for example by means of a slides) or rotation (filter wheel type).

b) in a variant (FIG. 5), the differences of path associated with each sensor may be generated by the arithmetic addition of the birefringences of plates 82 of identical nature and thickness, these plates being brought into (or removed from) the path of the light beam 84 by translation movements, for example on slides.

c) in a variant (FIG. 6) the differences of path associated with each sensor may be generated by the algebraic addition of the birefringences of plates 86, 88, 90,... of identical nature and increasing thicknesses, these plates being rotatable about the axis 84 of the beam and characterized by two stable positions separated by 90°, the slow and fast axes of the plates being constantly aligned, rotation of one plate allowing its birefringence to be added to or subtracted from that of the set of the other plates (exchange of the slow and fast axes).

d) in a variant (FIG. 7), the differences of path associated with each sensor may be generated by the algebraic addition of the birefringences of plates 86, 88, 90 of increasing thicknesses, these addition or subtraction operations being induced by the electric control of the intercalate half wave plates 92, whose axes are situated at 45° from those of the tuning elements.

These intercalate plates 92 are formed from materials of elasto-optical, electro-optical or other types, whose birefringence takes the value 0 or $\lambda/2$ depending on the control reference value.

It is also possible, as shown schematically in FIG. 6, to provide multiplexing in time of the signals coming from sensors 20 connected to the same optical line 76 leading to the analysis means 24. In this case, the pulses delivered by each source must be sufficiently brief for the distances separating the sensors or the groups of sensors to suffice for differentiating in time signals coming from the different sensors or the different groups of sensors. Processing of the data from each sensor is then identical to that described above, but for data delivered in synchronism by the different sensors during the measurement interval defined by the duration of the light pulse fed into line 76.

Identification of the sensors may then be of a purely temporal nature.

This multiplexing method may be used in combination with those described above in the case of continuous measurement.

The invention allows measurements of physical magnitude to be made at relatively great distances, for example 3 km or more, without influencing the transmission line, with high accuracy : a resolution of 200 000 points in the case where only a single sensor is used, or 1000 points if eight sensors are used connected to the same transmission line.

We claim:

1. An optoelectronic apparatus for the remote measuring of a physical magnitude, the apparatus comprising two light sources emitting luminous fluxes centered on two different wavelengths, means for controlling the alternate operation of these light sources, a sensor receiving the luminous flux emitted by one of the said light sources and then the luminous flux emitted by the other of said light sources, the sensor being subjected to the physical magnitude to be measured and causing a periodic spectral modulation of the luminous flux at a frequency depending on the value of the physical magnitude, and analysis means for analyzing the luminous flux transmitted by the sensor, said analysis means being of the static type and comprising a birefringent element which is tuned to the sensor and produces an optical path difference close to that produced by the sensor, the analysis means further comprising a set of polarization separating cubes which form four parallel analyzing channels, and a quarter wave-plate placed on two of the analyzing channels, the light signals at the outputs of the analyzing channels being of the form $1+\cos\phi$, $1-\cos\phi$, $1+\sin\phi$ and $1-\sin\phi$ respectively, $\phi$ being the phase of the light signal transmitted by the birefringent element, the analysis means further comprising photodetectors at the outputs of the four analyzing channels and data processing means connected to the photodetectors for computing the modulo $2\pi$ value of the said phase $\phi$, the difference of the central wavelengths of the luminous fluxes emitted by the light sources being such that the absolute value of the difference of the phase $\phi 1$ and $\phi 2$ of the signals transmitted successively by the birefringent element when the light sources are alternatively on and off remains less than $\pi$ for a given range of values of the physical magnitude to be measured.

2. An apparatus according to claim 1, wherein the analysis means comprise successively, with respect to the direction of propagation of the luminous flux transmitted by the sensor, a first polarization separating cube transmitting two light signals polarized in perpendicular planes over two first analyzing channels; said birefringent element being placed on these first analyzing channels; said quarter-wave plate being placed on one of these first analyzing channels; second polarization separating cubes placed on the first analyzing channels and transmitting four light signals polarized in perpendicular planes over the said four analyzing channels; and four photodetectors placed at the outputs of the second polarization cubes.

3. An apparatus according to claim 2, wherein each of the first and second polarization separating cubes is associated with a third polarization separating cube placed at one of its outputs, so that the luminous fluxes leaving the first and second polarization separating cubes directly are parallel to the luminous fluxes leaving the third polarization separating cubes and oriented int he same direction.

4. Apparatus according to claim 3, characterized in that the four photodetectors are placed on the same line.

5. Apparatus according to claim 2, characterized in that said quarter-wave plate is achromatic.

6. Apparatus according to claim 1, characterized in that the birefringent element is insensitive to temperature variations and has a very low spectral dependence.

7. Apparatus according to claim 6, characterized in that the birefringent element is formed of two plates coupled side by side, whose slow and fast axes are crossed.

8. Apparatus according to claim 7, characterized in that the coupled plates are formed of KDP and calcite respectively.

9. Apparatus according to claim 1, characterized in that the light sources are light-emitting diodes or super light-emitting diodes associated with thermal regulation circuits.

10. Apparatus according to claim 1, characterized in that the light sources comprise a common light source with wide spectrum, for example a filament lamp or an arc lamp, and interferential filters for the transmission of two predetermined wavelengths which are associated with a thermal regulation circuit.

11. Apparatus according to claim 1, characterized in that the circuits for controlling the light sources are designed for providing cycles of four measurements (a measurement on switching on and a measurement on switching off each light source) at a frequency of about 1 kHz for example.

12. Apparatus according to claim 1, characterized in that the sensor is connected to the analysis means by a multimode optical fibre at the output of which is provided a polarizing element oriented at 45° from the first polarization separating cube of the analysis means.

13. Apparatus according to claim 1, characterized in that it comprises a calibration circuit, having a direct connecting channel between the light sources and the analysis means, a connecting channel between a calibration sensor and the analysis means and obturators mounted in these two channels and in the measuring channel going from the measurement sensor to the analysis means.

14. Apparatus according to claim 13, characterized in that the calibration sensor of the calibration circuit is adapted for generating sequentially signals having a phase difference of $\pi/2$, and comprises for example a rotating polarizer with controlled angular orientation.

15. Apparatus according to claim 1, characterized in that it comprises means for calibrating the central wavelength of each light source, these means comprising birefringent elements arranged in parallel and generating closely related differences of path ($\Delta\circ$ and $\Delta'\circ$) or else a birefringent plate with low difference of path associated with the element and rotatable between given positions.

16. Apparatus according to claim 1, characterized in that it comprises several sensors mounted in parallel and having different frequencies of spectral modulation and as many analysis means mounted in parallel and each comprising a birefringent element tuned to the corresponding sensor, these sensors being connected to the analysis means by the same optical fibre and optical couplers.

17. Apparatus according to claim 1, characterized in that it comprises several sensors having different spectral modulation frequencies and mounted in parallel and connected to common analysis means by an optical coupler and a common optical fibre, these analysis means comprising a set of birefringent elements which can be tuned to each sensor successively.

18. Apparatus according to claim 1, characterized in that the analysis means are connected by an optical fibre to sensors which are remote from each other by distances such that the signals from these sensors may be separated in time during the measurement intervals defined by the light pulse widths emitted by the light sources.

* * * * *

UNITED STATES PATENT AND TRADEMARK OFFICE
CERTIFICATE OF CORRECTION

PATENT NO. : 5,179,424

DATED : January 12, 1993

INVENTOR(S) : Michel Lequime et al

It is certified that error appears in the above-identified patent and that said Letters Patent is hereby corrected as shown below:

Column 4, line 56, "misalignments" should be
-- misalignments --.

Column 5, line 65, "$\phi=\pi+2 K\rho$, K" should be
-- $\phi=\rho+2K\pi$, K --.

Column 6, line 6, an equal sign (=) should be inserted between "$\Delta\cdot$" and "optical".

Column 6, line 12, "size" should be -- magnitude --.

Column 9, line 53, "$\lambda$" should be -- $\Lambda$ --.

Column 10, line 66, "el" should be -- e1 --.

Column 12, line 7, "$\delta(\lambda)=\lambda/4$ for all $\lambda$" should be
-- $\Delta(\lambda)=\lambda/4$ for all $\lambda$ --.

UNITED STATES PATENT AND TRADEMARK OFFICE
CERTIFICATE OF CORRECTION

PATENT NO. : 5,179,424

DATED : January 12, 1993

INVENTOR(S) : Michel Lequime et al

It is certified that error appears in the above-identified patent and that said Letters Patent is hereby corrected as shown below:

Column 13, lines 46-47, "magnitude" should be --magnitudes --.

Column 14, lines 40-41, "int he" should be -- in the --.

Signed and Sealed this

Sixteenth Day of November, 1993

Attest:

BRUCE LEHMAN

Attesting Officer     Commissioner of Patents and Trademarks